A. D. HEDGES.
AUTOMOBILE TOP.
APPLICATION FILED OCT. 9, 1920.
1,390,557.
Patented Sept. 13, 1921.
2 SHEETS—SHEET 2.
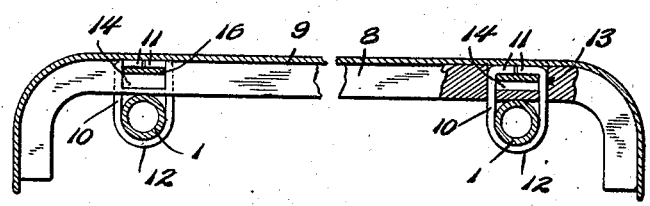
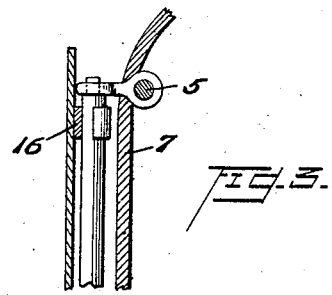
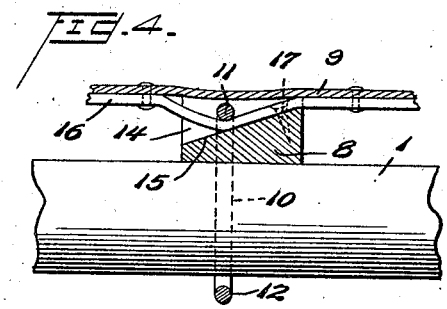
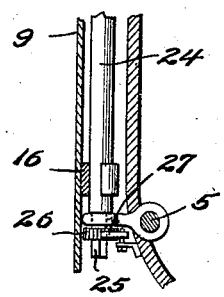
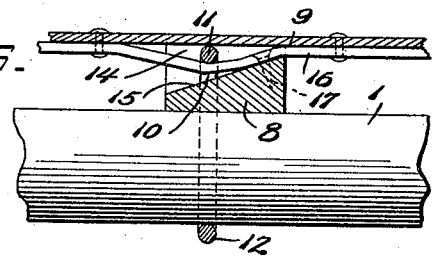
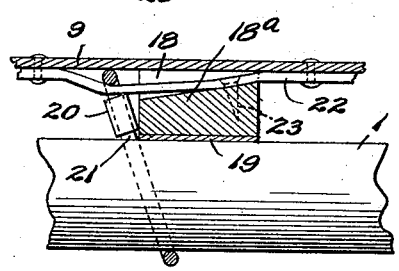
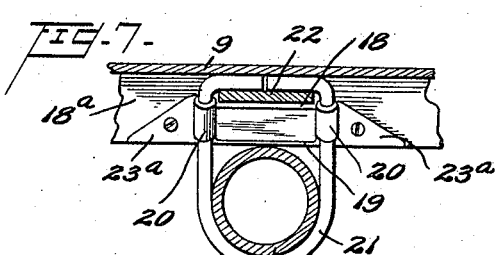
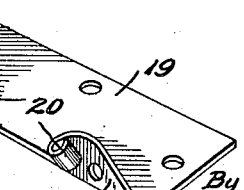

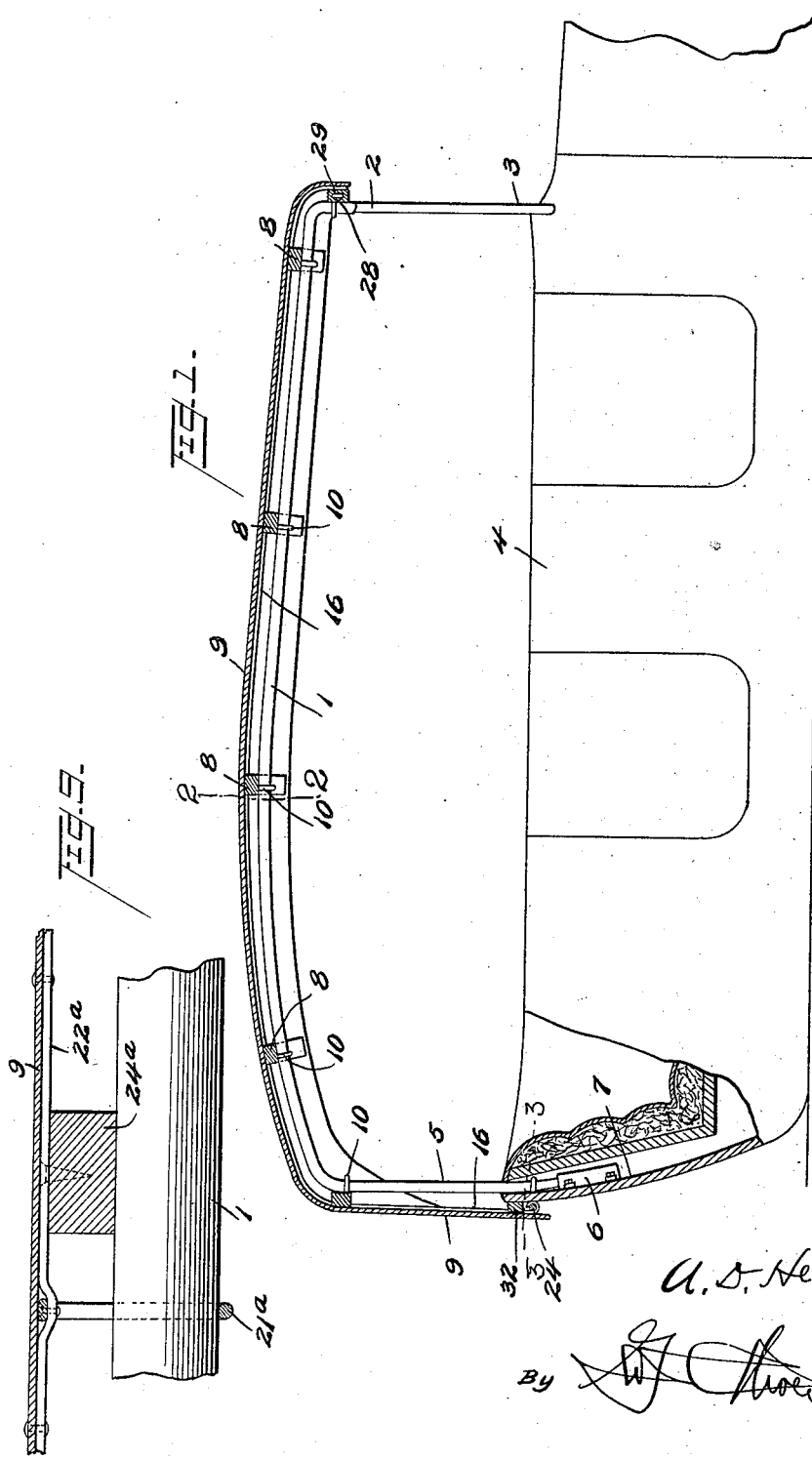

UNITED STATES PATENT OFFICE.

ABRAHAM D. HEDGES, OF LONG BEACH, CALIFORNIA.

AUTOMOBILE-TOP.

1,390,557.   Specification of Letters Patent.   Patented Sept. 13, 1921.

Application filed October 9, 1920. Serial No. 415,718.

*To all whom it may concern:*

Be it known that I, ABRAHAM D. HEDGES, a citizen of the United States, residing at Long Beach, in the county of Los Angeles and State of California, have invented certain new and useful Improvements in Automobile-Tops, of which the following is a specification.

The invention relates to improvements in automobile tops.

The object of the present invention is to improve the construction of automobile tops and to provide a simple, practical and efficient one man automobile top of strong, durable and inexpensive construction equipped with a flexible cover slidable along the frame of the automobile top and adapted, when not in use, to be compactly arranged at the back of an automobile and capable, when arranged for use, of automatically engaging the slidable connection between the top and the frame with the latter to prevent rattling or jumping of slidable transverse bows or slats on the top frame and adapted also to permit the parts to slide freely on the top frame when the tension is removed and the cover released.

A further object of the invention is to provide an automobile top of this character adapted to permit the flexible cover to fit flat against the slidable transverse bows or slats and provided with means for properly spacing or positioning the slidable bows or slats and of relieving the flexible material of the cover of strain when the parts are placed under tension and the automobile top is in use.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of reference designate corresponding parts in the several figures:—

Figure 1 is a longitudinal sectional view of an automobile top constructed in accordance with this invention and shown applied to an automobile body, the latter being partly in section and the flexible cover being extended for use.

Fig. 2 is a transverse sectional view on the line 2—2 of Fig. 1.

Fig. 3 is a horizontal sectional view on the line 3—3 of Fig. 1, illustrating the manner of mounting the swinging or ratchet shaft.

Fig. 4 is an enlarged detail sectional view taken transversely of one of the bows and illustrating the arrangement of the parts when the cover is not under tension.

Fig. 5 is a similar view illustrating the arrangement of the parts when the cover is under tension.

Figs. 6 and 7 are detail sectional views illustrating a modification of the invention in which the slidable loop member is mounted in a bracket plate.

Fig. 8, is a detail perspective view of the attaching plate.

Fig. 9 is an enlarged detail sectional view illustrating another embodiment of the invention in which the loop member is attached to the flexible strap in spaced relation with the transverse slat or bow.

In the accompanying drawings in which is illustrated the preferred embodiment of the invention, the top frame of the automobile top is composed of two longitudinal side members 1 designed to be constructed of any suitable material and to be connected at their front ends with the posts 2 of the wind shield 3 of an automobile 4 in any desired manner and provided with downwardly curved rear portions 5 which are preferably mounted in suitable sockets 6 in the back of the rear seat 7 of the automobile 4, but the side members of the top frame, which may be either permanent or detachable, may be constructed as shown and described in an application filed by me on or about the 15th day of December 1919, Serial No. 345,103.

Slidably mounted on the top frame is a series of transverse bows or slats 8 designed to be constructed of wood or any suitable material and having a flexible cover 9 secured to them. The transverse bows or slats which are oblong in cross section are arranged flat upon the side members of the top frame and are slidably connected with the same by substantially oblong loop members 10 composed of sides and connecting top and bottom portions 11 and 12, the bottom portions being curved to conform to the configuration of the side members of the top frame when the said side members, as shown, are constructed of tubular material. The sides of the loop members are mounted in vertical openings 13 in the transverse bows or slats which are provided in their upper faces directly above and in line with the side members of the top frame with recesses 14 tapering in depth and presenting inclined bottom walls or faces 15. The recesses 14 of the slats or bows are arranged in alinement and receive flexible straps 16 of webing or other suitable material secured in the recesses at one side of the median longitudinal plane of the slats or bows by fastening devices 17 located adjacent the shallow ends of the recesses as shown. The recesses which receive the flexible straps permit the same to lie below or in flush relation with the upper faces of the said slats or bows so that the flexible cover may fit flat against the said upper faces of the slats or bows. The flexible strap passes through the upper portions of the vertical slidable loop members and when not under tension lies upon the inclined bottom faces or walls of the recesses permitting the slidable loop members to drop to the limit of their downward movement and thereby loosely embrace the side members of the top frame. When the flexible strap is placed under tension by the means hereinafter described, it is lifted from the inclined bottom walls of the recesses and stretched to substantially a horizontal position thereby lifting the slidable loop members and causing the same to bind against and firmly clamp the side members of the top frame whereby the slats or bows will be prevented from jumping or rattling on the top frame when the automobile is traveling over rough roads. As soon as the flexible straps of the slidable cover are slackened, they will permit the slidable loop members to drop by gravity and free themselves from their clamping engagement with the side members of the top frame. This will enable the flexible cover to slide freely along the top frame for folding the flexible cover at the back of the automobile.

Instead of cutting a relatively deep recess 14 in the transverse bows or slats, the transverse bow or slat 18ª may, as illustrated in Figs. 6 and 7 of the drawings, be provided with a shallow recess 18 and be equipped with an attaching or bracket plate 19 secured to the lower face of the slat or bow and projecting therefrom and provided in their projecting portion with inclined guides 20 for slidably receiving loop members 21 of the same construction as those hereinbefore described and adapted to be operated by a flexible strap 22 secured to the shallow recess 18 by suitable fastening devices 23. The attaching plate is provided at the rear edge of the transverse bow with spaced upwardly extending flanges 23ª secured to the slat or bow and located at opposite sides of the recess in which the flexible strap is secured. The inclined guides 20 are preferably formed by rolling the inner terminal portions of the flange 23ª to form cylindrical tubular guides. The inclination of the guides 20 and the loop member which extends upwardly and rearwardly enables the loop member to be readily operated by the flexible strap for causing the loop member to engage or grip the side member of the top frame. Also the loop members will readily release the side members of the top frame when the flexible straps are slackened. The flexible strap is adapted to slacken above the projecting portion of the plate 19 to permit the slidable loop member to move downwardly and release the side member of the top frame of its clamping engagement and when the flexible strap 22 is stretched or tightened, it will lift the slidable loop member 21 and engage the same with the side member of the top frame. The plate 19 may project either in front or in rear of the transverse slats or bows and the recess 14 may taper in either direction as will be readily understood.

In Fig. 9 of the drawings is illustrated another embodiment of the invention in which the loop member 21ª is secured to a flexible strap 22ª a short distance from the transverse slat or bow 24ª and is adapted to be operated by the tensioning and slackening of the flexible strap. The arrangement illustrated in Fig. 9 may be advantageously employed on some vehicles for preventing the slats from jumping or rattling.

The rear ends of the flexible straps are suitably connected to a transverse winding shaft 24 suitably mounted at the back of the automobile and having one end 25 squared to receive a crank handle and equipped with a ratchet wheel 26 adapted to be engaged by a pawl 27 for locking the winding shaft to hold the flexible cover and the straps in a stretched condition. The front bow to which the flexible cover and the front ends of the straps are detached, may be detachably interlocked with the top frame at the front thereof as shown and described in the aforesaid application by means of headed studs 28 and approximately T-shaped recesses 29. The studs 28 project from the top frame and the recesses 29 are formed in the front transverse bow or shaft. When the front bow 30 is detachably interlocked with the front of the top frame in this manner, it is unnecessary to equip the same with a slidable loop member and rigid loop member 31 may be employed.

The flexible covering is provided at the rear end, at the lower edge of the rear curtain portion, with a transverse bow or slat 32 to which the flexible straps are riveted or otherwise secured. The rear bow or slat 32 may be constructed of wood or metal in any desired manner and it will conform to the configuration of the lower portion of the rear curtain and will maintain the proper contour of the rear curtain without interfering with the operation of the vehicle top. The construction permits the flexible cover to be made of a single piece of material without waste and a minimum amount of material is required in the bows and frame for any shape or style of vehicle top and the latter may be easily constructed without the services of a skilled cabinet maker.

What is claimed is:—

1. An automobile top including a top frame, a flexible cover, transverse bows or slats arranged at intervals and secured to the cover, members slidably connected with the slats or bows and slidable on the top frame, and a flexible connection attached to the bows or slats and arranged when placed under tension to engage the slidable members with the top frame.

2. An automobile top including a top frame, a flexible cover, transverse bows or slats arranged at intervals and secured to the cover, members slidably connected with the slats or bows and slidable on the top frame, and a flexible connection attached to the said bows or slats and extending through the slidable members and arranged to cause the same to clamp the top frame when the said flexible connection is placed under tension.

3. An automobile top including a top frame, a flexible cover, transverse bows or slats arranged at intervals and secured to the cover, loop members of substantially oblong form slidably connected with the bows or slats and receiving and slidable on the top frame and movable upwardly and downwardly to clamp and release the said top frame, and means for operating the loop members to cause the same to engage and release the said top frame.

4. An automobile top including a top frame, a flexible cover, transverse bows or slats arranged at intervals and secured to the cover, loop members of substantially oblong form slidably connected with the bows or slats and receiving and slidable on the top frame and movable upwardly and downwardly to clamp and release the said top frame, and a flexible connection extending through the loop members and arranged when placed under tension to carry the loop members into clamping engagement with the top frame.

5. An automobile top including a top frame, a flexible cover, transverse bows or slats arranged at intervals and secured to the cover, loop members of substantially oblong form slidably connected with the bows or slats and receiving and slidable on the top frame and movable upwardly and downwardly to clamp and release the said top frame, and a flexible strap secured and spacing the bows or slats and extending through the loop members and arranged when placed under tension to carry the said loop members into engagement with the said top frame.

6. An automobile top including a top frame having a longitudinal member, a flexible cover, transverse slats or bows secured to the flexible cover and arranged upon the said member and provided with recesses, a flexible strap secured in the recesses of the slats or bows and connecting and spacing the same, and slidable members receiving the said longitudinal member of the top frame and connected with and carried by the bows or slats and actuated by the flexible strap when the same is placed under tension whereby the slidable members are moved into clamping engagement with the said longitudinal member.

7. An automobile top including a top frame having a longitudinal member, a flexible cover, transverse slats or bows secured to the flexible cover and provided with alined recesses, said slats or bows being also provided at the opposite sides of the recesses with openings, loop members slidable in the openings and receiving and slidable along the said longitudinal member of the top frame, and a flexible strap secured in the recesses of the slats or bows and extending through the loop members and arranged and placed under tension to carry the loop members into engagement with the longitudinal frame member.

8. An automobile top including a top frame having a longitudinal member, a flexible cover, transverse slats or bows secured to the flexible cover and arranged upon the longitudinal member, said slats or bows being provided with tapering recesses and having openings at opposite sides thereof, and loop members slidably mounted in the said openings, a flexible strap secured in the said recesses and extending through the loop members and adapted to be placed under tension to carry the loop members into clamping engagement with the longitudinal member.

9. An automobile top including a top frame having side members, a flexible cover, transverse slats or bows secured to the flexible cover and arranged upon the side members, loop members receiving the side members and slidable along the same and also slidably connected with and carried by the slats or bows, flexible straps extending through the loop members and a transverse shaft connected with the flexible straps and adapted to place the same under tension whereby the slidable loop members are carried into clamping engagement with the side members of the frame.

10. An automobile top including a top frame, a flexible cover, transverse slats or bows arranged at intervals and connected with the flexible cover, a flexible strap connecting the slats or bows and loop members movable with respect to the slats or bows and slidable on the top frame and actuated by the flexible strap for gripping or engaging the top frame when the flexible strap is placed under tension.

11. An automobile top including a top frame, a flexible cover, slats or bows arranged at intervals and connected with the flexible cover, loop members movable with respect to the slats or bows and slidable on the top frame, and a flexible strap secured to the slats or bows and passing through the loop members and adapted to actuate the same to cause the loop members to grip or clamp the top frame when the flexible strap is placed under tension.

In testimony whereof I have hereunto affixed my signature.

ABRAHAM D. HEDGES.